United States Patent [19]
Fritze et al.

[11] Patent Number: 5,390,019
[45] Date of Patent: Feb. 14, 1995

[54] LASER GYRO BUILT IN TEST METHOD AND APPARATUS

[75] Inventors: Keith R. Fritze, Minnetonka; Joseph E. Killpatrick, Minneapolis; Dale F. Berndt, Plymouth, all of Minn.

[73] Assignee: Honeywell Inc., Minneapolis, Minn.

[21] Appl. No.: 922,611

[22] Filed: Jul. 17, 1992

[51] Int. Cl.6 .................... G01B 9/02; H01S 3/083
[52] U.S. Cl. ...................... 356/350; 372/94
[58] Field of Search ........................... 356/350

[56] References Cited

U.S. PATENT DOCUMENTS

| | | | |
|---|---|---|---|
| 4,299,490 | 11/1981 | Cahill et al. | 356/350 |
| 4,342,517 | 8/1982 | Johnson et al. | 356/350 |
| 4,702,600 | 10/1987 | Handrich et al. | 356/350 |
| 4,718,766 | 1/1988 | Greenstein | 356/350 |

Primary Examiner—Stephen C. Buczinski
Attorney, Agent, or Firm—Robert Pajak

[57] ABSTRACT

A laser gyro built in test apparatus. A laser gyro includes a microprocessor which provides a high speed method of communicating test data to an external inertial navigation system. The microprocessor performs tests on the gyro including temperature sensor tests, dither drive tests, active current control tests, and reports on the expected life of the gyro. The gyro can be commanded from the external system to perform any number of the built in test functions. The built in test functions are periodically executed to evaluate the health of the laser gyro and are thereby incorporated in the monitor control loop of the laser gyro.

6 Claims, 13 Drawing Sheets

| 0 | 1 | 2 | 3 | 4 | 5 | 6 | ... |
|---|---|---|---|---|---|---|---|

334 ↗ 337

- 0: DITHER DRIVE OK
- 1: READ-OUT COUNTER OK
- 2: LASER DRIVE CURRENT OK, LEG 1
- 3: LASER DRIVE CURRENT OK, LEG 2
- 4: TEMP SENSOR HI LIMIT TEST OK
- 5: TEMP SENSOR LO LIMIT TEST OK
- 6: MISSING SAMPLE STB DETECTED

BUILT-IN TEST EQUIPMENT (BITE) STATUS REGISTER CYCLIC BIT FUNCTIONS

Fig. 14

LASER GYRO BUILT IN TEST METHOD AND APPARATUS

This application is related to U.S. patent application Ser. No. 07/922,612, which is commonly owned with the present application.

BACKGROUND OF THE INVENTION

1. Field of the Invention

This patent relates to a method of testing a laser gyro and more particularly to a method of testing a laser gyro that provides both self testing capabilities and self diagnostics.

2. Discussion of the Prior Art

Ring laser angular rate sensors, also called laser gyros, are well known in the art. One example of a ring laser angular rate sensor is U.S. Pat. No. 4,751,718 issued to Hanse, et al., which is incorporated herein by reference thereto. Present day ring laser angular rate sensors include a thermally and mechanically stable laser block having a plurality of formed cavities for enclosing a gap. Mirrors are placed at the extremities of the cavities for reflecting laser beams and providing an optical closed-loop path.

It is highly desirable for a laser gyro to be able to execute self tests in order to provide the inertial navigation system using the laser gyro to estimate its reliability and functionality. Therefore, it is the motive of this invention to provide a built in test capability into a laser gyro orchestrated by an integrated microcontroller.

SUMMARY OF THE INVENTION

The invention provides a method of self testing a laser gyro and testing a laser gyro upon request from an external system. The laser gyro has a system communication protocol that is used to implement the execution of a number of laser gyro tests. The laser gyro reports the states of a test register which represents the health of the laser gyro. The test register indicates the health of the dither drive read out counter, laser drive current for leg 1 of the active current control, laser drive current for leg 2 of the active current control, temperature sensor during high limit tests, temperature sensor during low limit tests, and sample strobe. The laser gyro provides a high speed interface for the communication of test information. The laser gyro also has a number of built in monitors including the laser drive monitor, the dither drive monitor, and the temperature sensor monitor. A missing sample strobe is predicted by anticipating the occurrence of the next sample strobe. If the next sample strobe does not occur it is assumed that the sample strobe is missing.

Other objects, features and advantages of the present invention will become apparent to those skilled in the art through the description of the preferred embodiment, claims and drawings herein where like numerals refer to like elements.

DESCRIPTION OF THE PREFERRED EMBODIMENTS

Figure 1:
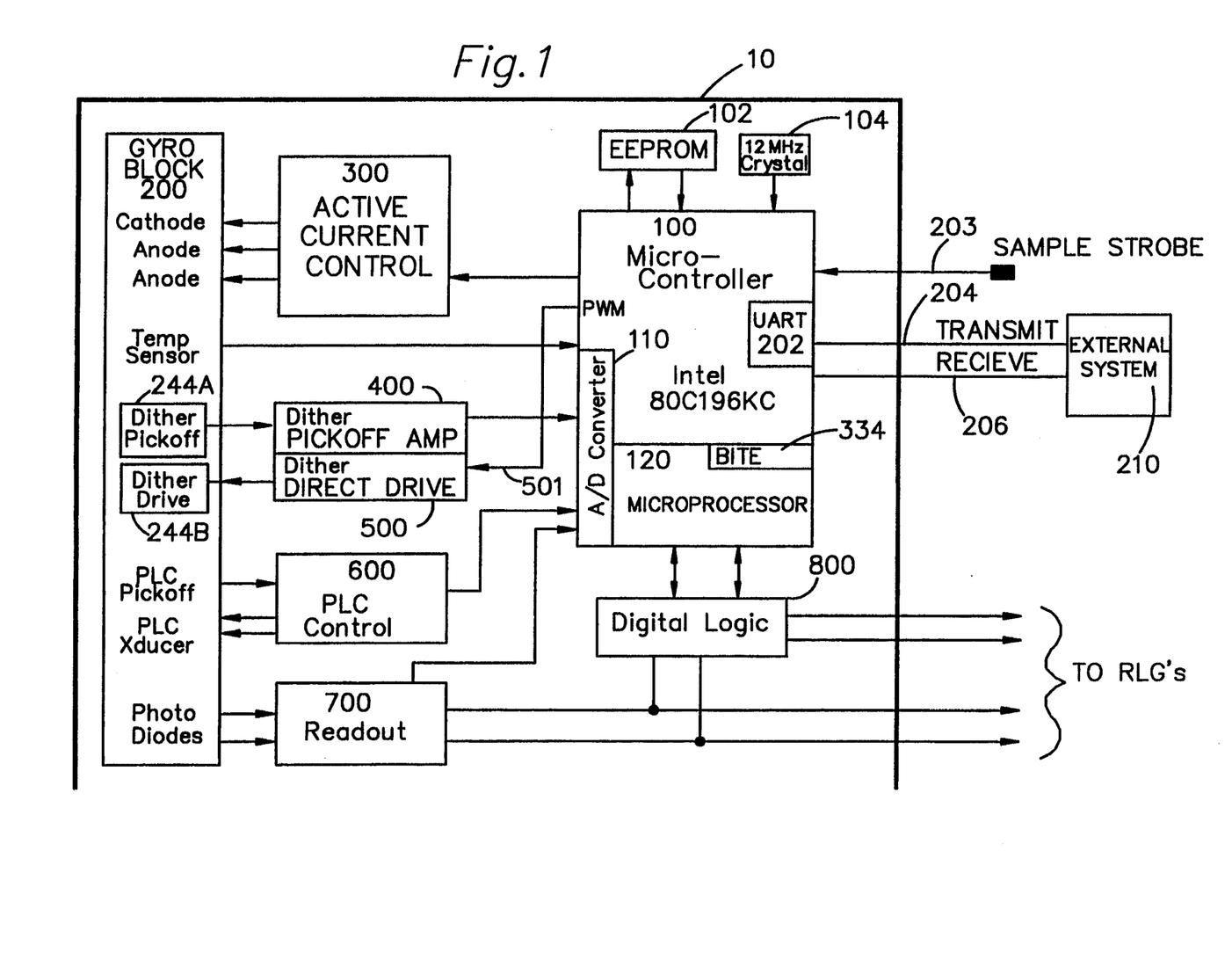
FIG. 1 shows a schematic diagram of the laser gyro of the method of the invention.

Referring now to FIG. 1 which shows a block diagram of one embodiment of a modular laser gyro employing the novel features of the present invention. The instant invention will be explained by way of example embodiments. Those skilled in the art having the benefit of this disclosure will appreciate that the examples herein are by way of illustration of the principles of the invention and not by way of limitation. Laser gyro 10 includes a controller 100 including a built in test equipment (BITE) register 334, a laser gyro block 200, an active current control 300, dither pickoff amplifier 400, direct digital dither drive 500, a path length control (PLC) device 600, a readout 700, and digital logic 800. The microcontroller 100 further includes a universal asynchronous receiver-transmitter (UART) 202 which communicates to an external system 210 through transmit line 204 and receive line 206.

Figure 2:
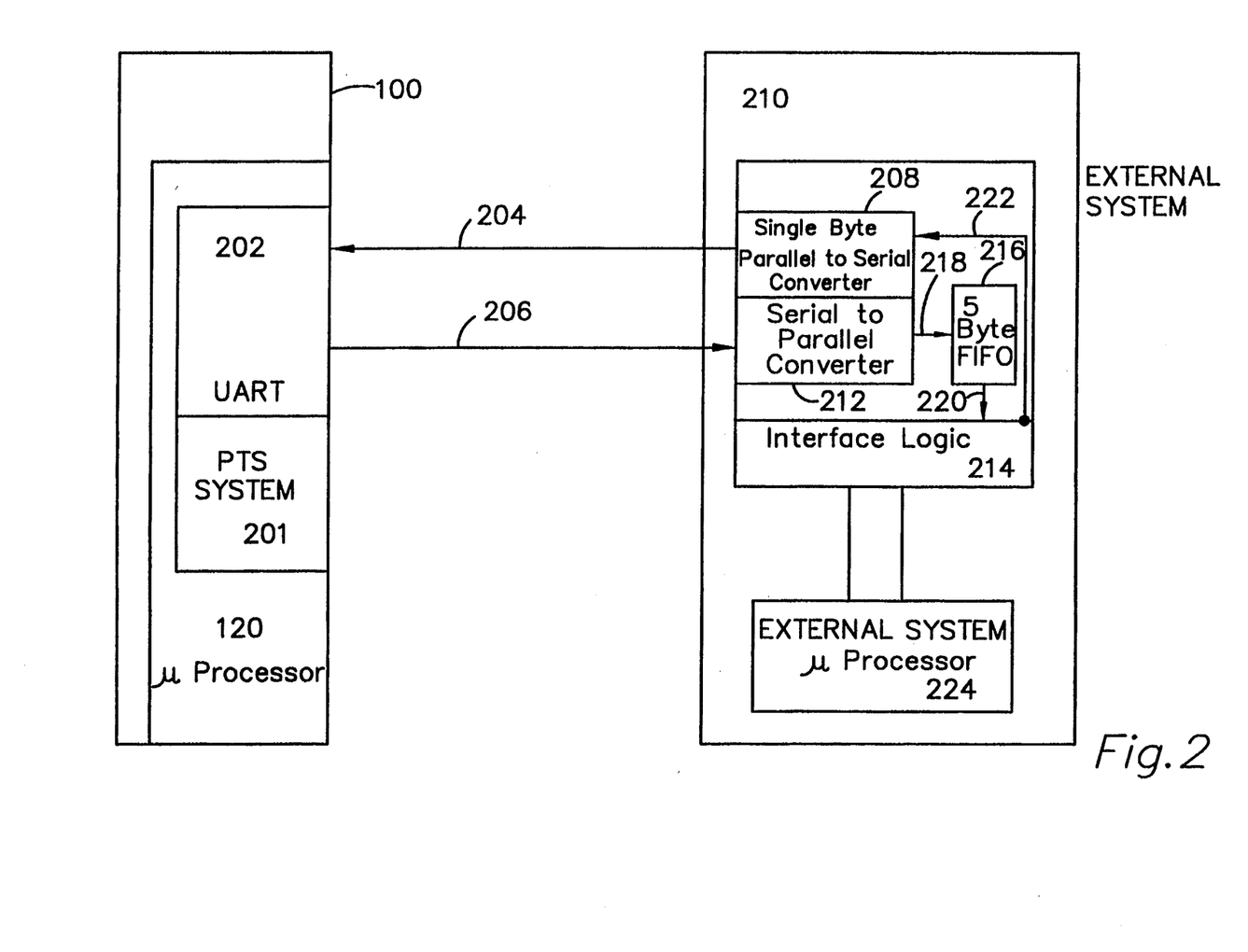
FIG. 2 shows the hardware schematic diagram for the high speed communication system of the method of the invention.

FIG. 2 shows a hardware diagram for the apparatus of the invention used to interface a laser gyro microcontroller 100 to an external processor 210. The laser gyro system 210 includes a microprocessor 120. The microprocessor 120 includes a high speed UART 202 controlled by a peripheral transaction system 201. The UART 202 communicates to the external system 210 on transmit line 206 and receive line 204. Line 206 is connected to the external system processor 210 through a serial to parallel converter 212. The serial to parallel converter 212 provides information on line 218 to a five Byte first-in-first-out register (FIFO) 216. The five Byte FIFO 216 interfaces to processor interface logic 214 which provides information to an external system microprocessor 224 for further processing. The interface logic 214 provides commands from the external system microprocessor 224 through serial interface line 222 to a single byte parallel to serial converter 208. The single byte parallel to serial converter 208 provides information to the laser gyro microprocessor 120 on receive line 204.

The apparatus of FIG. 2 provides a way of communicating high speed serial data into a queue in the serial to parallel converter 212 which provides a five Byte FIFO 216 with high speed interface data that can be accepted by the external processor 224. The apparatus of FIG. 2 provides a bidirectional means by which information can flow between the two processors 120 and 224 at a very high rate.

The microprocessor controlled configuration and control of the laser gyro 10 is accomplished through the communication of a command set. These commands are generally defined in four types. The four command types for the laser gyro are, first the parameter load commands, second the gyro control commands, third the gyro status commands, and fourth the gyro calibration and diagnostics commands.

Parameter load commands provide a way of loading constants into the microprocessor's EEPROM 102. Parameter load commands can be of two types. The first type is a one-word command, the second type is a two-word command. In one example embodiment of the invention a word is defined as sixteen bit unsigned quantity.

Two-word parameter load commands fall into the types of commands requiring a two byte physical address in the EPROM, for example, command 0 hexadecimal loads the K1 constant into the EPROM at word addresses 0 and 1, command 1 loads the constant K2 into word addresses 2 and 3, etc. These commands occupy the 0–F hexadecimal address location. These constants occupy word addresses 0-1 FH in the EEPROM 102. The following table lists two-word parameter load commands.

TABLE A

1. CMD 0H—Load compensation constant K1.
2. CMD 1H—Load compensation constant K2.
3. CMD 2H—Load compensation constant K3.
4. CMD 3H—Load compensation constant K4.
5. CMD 4H—Load compensation constant KI.
6. CMD 5H—Load compensation constant KI2.
7. CMD 6H—Load compensation constant K7.
8. CMD 7H—Load compensation constant K9.
9. CMD 8H—Load Serial Number. Format is TBD.
10. CMD 9H—Load Build Date. Format is TBD.
11. CMD AH—Load Alignment X.
12. CMD BH—Load Alignment Y.
13. CMD CH—Load Current (min,max) Limits; microamperes.
14. CMD DH—Load Power (min,max) Limits. Power is in milliwatts.
15. CMD EH—Load initial Dither stripper AGC gain constant.

One-word parameter load commands are loaded into EEPROM starting at address 40H. These command codes represent the physical address in the EEPROM where data is to be stored. These commands are listed below with explanations in Table B.

TABLE B

1. CMD 20H—Load Operating Hours. This command initializes the operating hours to a value specified in command parameter 1 into the EEPROM.
2. CMD 21H—Load Dither Frequency. This command loads the dither frequency Hz into the EEPROM.
3. CMD 22H—Load Dither Command Angle. This command loads the dither command angle into the EEPROM. This value is used by the modular gyro system during power-on to set the initial command angle.
4. CMD 23H—Load PLC Mode Ref Voltage. This command loads the PLC mode reference voltage into the EEPROM.
5. CMD 24H—set laser run current. This is a 4 bit value to set the initial laser run current.

Gyro control commands are those commands that either set the gyro operating parameters or alter gyro dither angle or write parameters check sum. The set gyro operating parameters commands changes the operating modes of the gyro. Various bits are associated with various operating states of the gyro. The command code for the set gyro operating parameters command is 30H. Bit 0 of the command selects either constant current or constant power operation. Bit 1 is used to restart the system. Bit 2 is used to turn the compensation on or off for the gyro. Bit 3 is used to turn the noise for the gyro on or off.

The next command used in the gyro control command set is to alter gyro dither angle command. This command allows the dither angle to be altered to a value specified by the first parameter word in the command. The command code for this command is 31H.

The next command for the gyro control command set is the right parameter's check sum command. This command generates an overall check sum on the parameters currently in the EEPROM 102 and stores this value in the EEPROM 102. This check sum is used to determine whether or not the EEPROM 102 was loaded with the correct information or expected information.

The gyro read status commands allow gyro system functions to be monitored on the serial output data port 206. These commands begin at address 40H. The first read status command is command 40H which is read current control loop current command. This command returns the current control loop current from the gyro 10. The information returned is in microamperes. The read temperature command address 41H returns the current gyro temperature in degrees Kelvin. The readout intensity monitor (RIM) command address 42H turns the current RIM signal level. The read operating hour's command returns the number of hours to the nearest hour that the gyro 10 has been in active operation. This command's address is 43H. The read time to fail command address 44H returns the remaining number of hours the gyro has until a failure may occur. Command addresses 50H-5FH reads the calibration constants used for the gyro. The final commands are the enter calibration or diagnostic modes commands which are commands that enable the gyro to calibrate itself or diagnose any potential problems.

Figure 3:
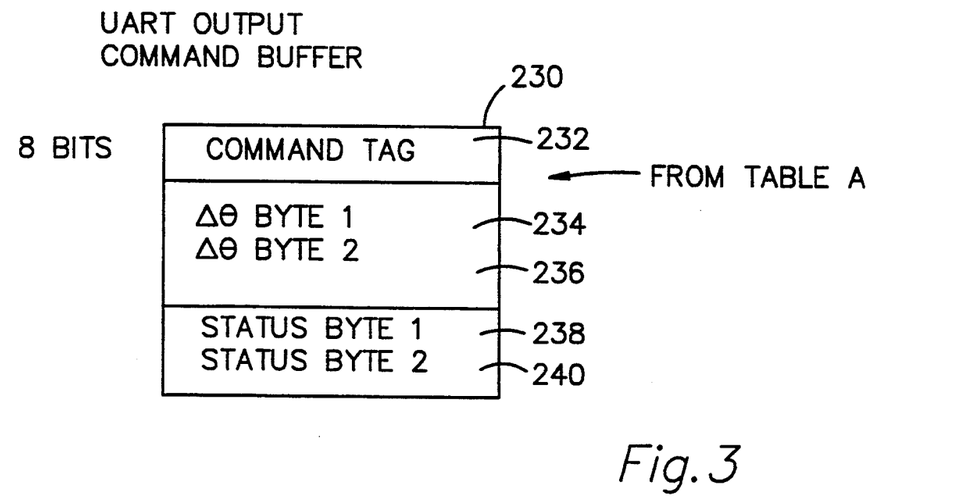
FIG. 3 shows the output frame for a command for the laser gyro.

Referring now to FIG. 3 which shows the structure of the UART output to command buffer for the microcontroller 100 UART in 202. When information is sent from the microcontroller 100 to the external system processor 224 the information is transmitted in a five byte structure called a frame. The output frame 230 comprises a command tag 232, a delta theta byte 234, a delta theta byte 236, a status byte 238, and a status byte 240. The status tag 232 is a reference to the type of status data the laser gyro system status tag is sending status data includes such information as compensation coefficients, path length control voltage levels, laser gyro temperatures and the status of the last command sent to be executed. The delta theta byte 234 and delta theta byte 236 are the dither stripped compensated inertial navigation measurements of the laser gyro 10. Status byte 1 238 and status byte 2 240 are the information resulting from the command.

The serial output data character format is asynchronous and 10 bits in length in one embodiment of the invention. The data is in the format of one start bit, one stop bit, and 8 data bits. In one embodiment of the invention the maximum clock rate is 12 megahertz resulting in a 750 Kbaud communication Rate.

Figure 4:
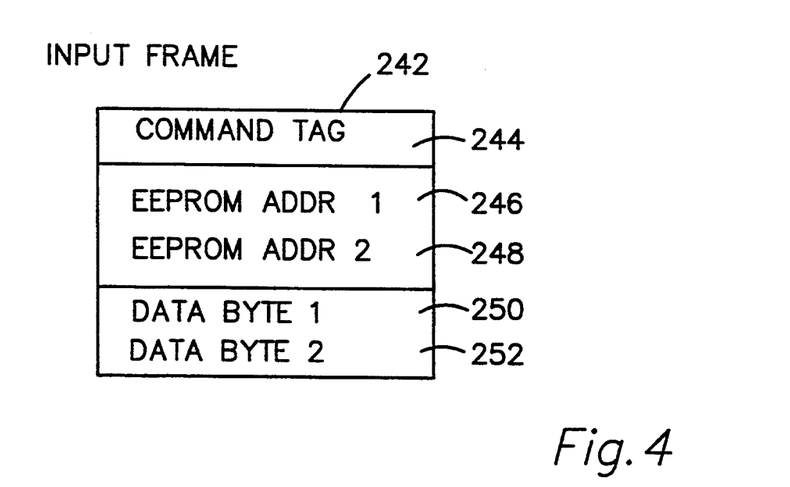
FIG. 4 shows the input frame for communications from an external host external system to the laser gyro.

Now referring to FIG. 4 which shows the laser gyro of the invention's input frame format. The input frame 242 is composed of a number of elements. The first element is a command tag similar to the output frame 230. Command tag 244 provides the microprocessor 120 of the laser gyro a validity flag used to verify a write command. The EEPROM address 246 and EEPROM address 248 contains the location in the EEPROM 102 of the data to be stored. The data byte 1 and data byte 250 and 252 provide the actual data to be stored into the EEPROM 102 at EEPROM address 246 and EEPROM address 248.

Data is sent through the output channel from the gyro 10 to the external system 210 continuously at a predetermined update rate. This is to provide inertial navigation data to the external system 210 from the microprocessor 120 that is current and that may also include other information encoded in the status bytes.

Figure 14:
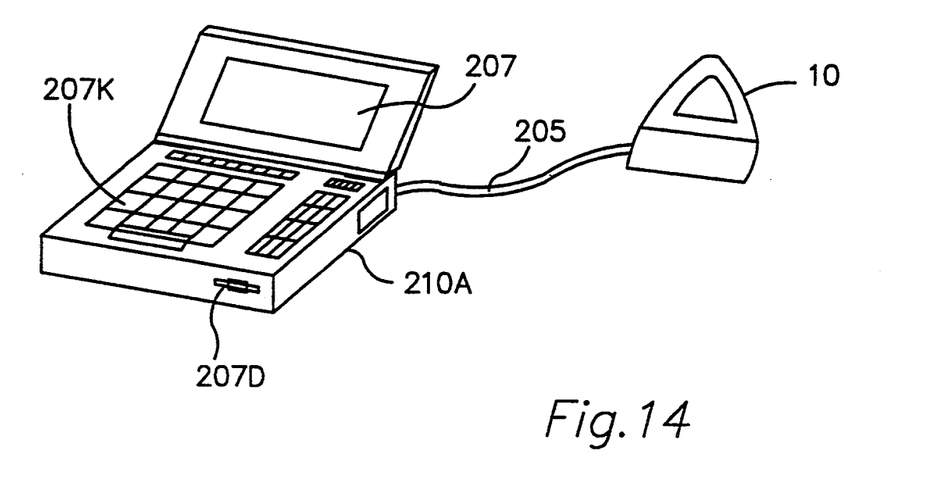
FIG. 14 shows a schematic diagram of a test apparatus of the invention.

Now referring to FIG. 14 which shows an alternate embodiment of the invention using an external system 210A which communicates with the laser gyro 10 of the invention as described herein. The system level control of the laser gyro 10 in this configuration is accomplished using interactive commands from the control system 210A. The control system 210A may advantageously comprise a microprocessor-based computer such as a personal computer, for example. The system 210A displays information to a human operator through visual screen 207. The operating parameters of the laser gyro system 10 are displayed on screen 207. The user uses the keyboard 207K of the control computer 210A. Those skilled in the art will recognize that gyro 10 operating parameters can be stored on removable media floppy disk 207D. The operation of the gyro 10 can be automated through a number of user interfaces including a window based system or other interactive systems. Those skilled in the art will also realize that batch-oriented testing commands can be loaded in the external system 210A and used to periodically monitor the performance of the laser gyro system 10 over long time periods.

Figure 5:
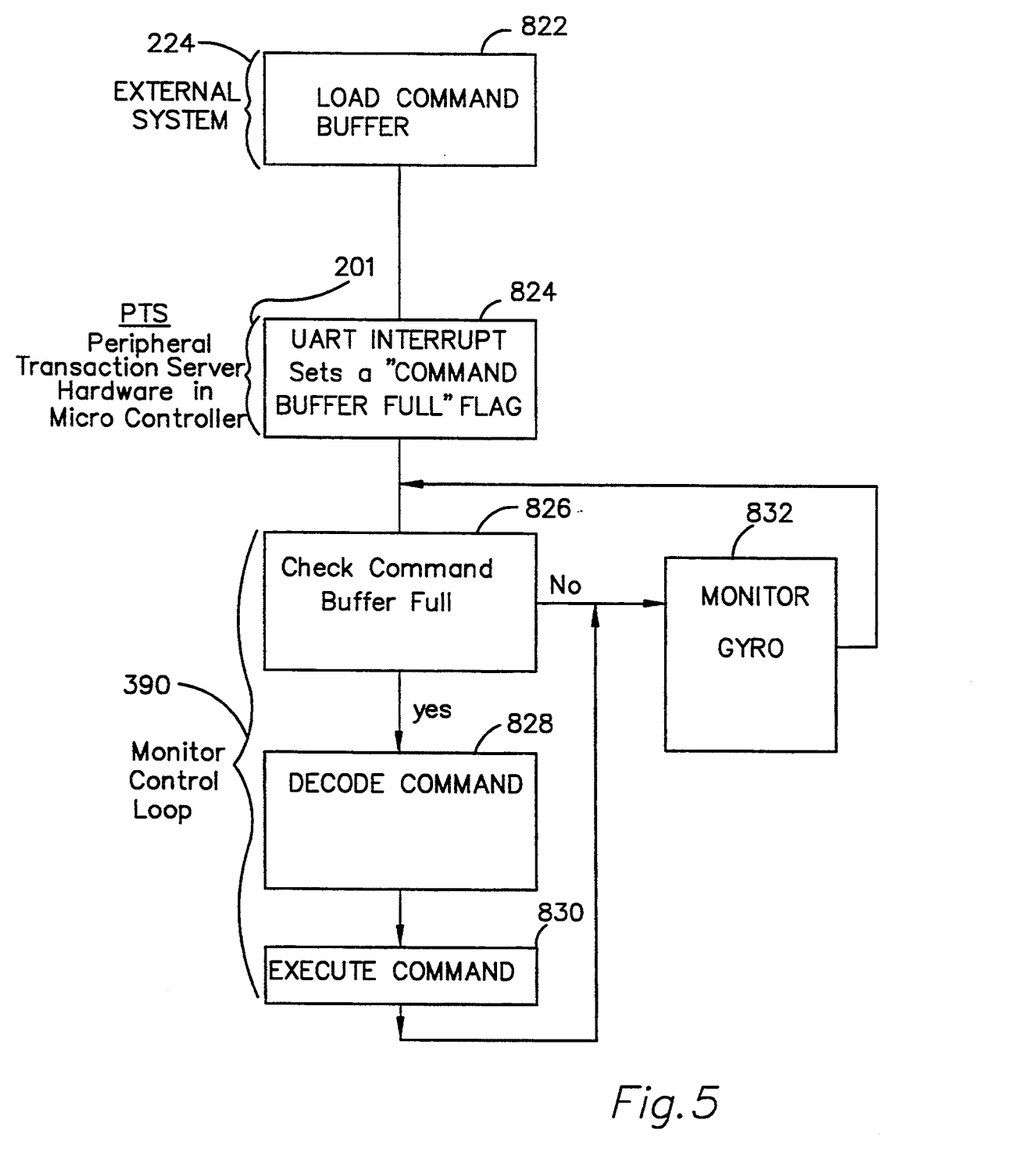
FIG. 5 shows a method of communicating between the external system and the laser gyro as employed by one embodiment of the invention.

Now referring to FIG. 5 which shows one method of the invention used to communicate between an external system 210 and the system microcontroller 100 for the laser gyro 10. The external system 210 could alternately include an inertial navigation system or a laser gyro test system. The external system 210 is responsible for loading a command into the command buffer 230 at step 822. The command structure is shown better with reference to FIG. 3. The command is communicated over the receive line 204. The peripheral transaction server 201 which is part of the microprocessor 120 sets a "command buffer full" flag. The UART 202 generates an interrupt which sets the command buffer full flag in step 824. The process of FIG. 5 then flows to enter a monitor control loop 390 and at step 826 checks whether or not the command buffer is full. If the command buffer is not full the process flows to step 832 to continue execution of the monitor control loop. If the command buffer 230 is full the process flows to decoding the command in step 828 and the process executes the command decoded in step 828 and step 830. The process then flows to step 832 to monitor the gyro. The process then flows to check the "command buffer full" flag in step 826 and repeats.

The laser gyro communicates with the external system 210 for many functions including reporting self test activities. The laser gyro includes a built in test equipment status register or BITE register 334 that reports the status of built in test functions, self test functions, that are executed periodically. These periodic built in test functions are called cyclic BIT functions.

Figure 6:
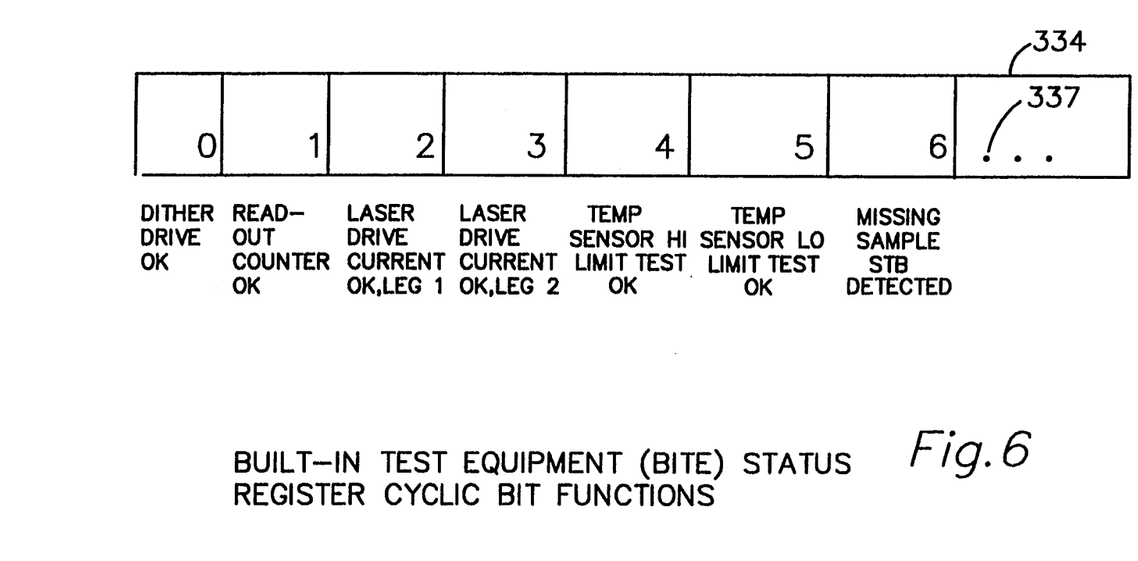
FIG. 6 shows the built in test equipment status register.

Now referring to FIG. 6 which shows the built in test equipment status register 334. Each bit of BITE register 334 holds a particular meaning. Bit 0 of the BITE register 334 indicates the health of the dither drive. Bit 1 of the BITE register 334 indicates the health of the read out counter. Bit 2 of the BITE register 334 indicates the health of the laser drive current for the leg 1 of the laser gyro. Bit 3 of the BITE register 334 indicates the health of the laser drive current leg 2. Bit 4 of the BITE register 334 indicates the health of the temperature sensor while testing for a high temperature limit. Bit 5 of the BITE register 334 indicates the health of the temperature sensor while testing for a low temperature limit. Bit 6 of the BITE register 334 indicates the existence of a sample strobe 203 to the laser gyro 10. Those skilled in the art will recognize that other features of the laser gyro 10 can be tested and their health reported in the BITE register 334 as indicated by ellipsis dots 337 in the BITE register 334.

Figure 7:
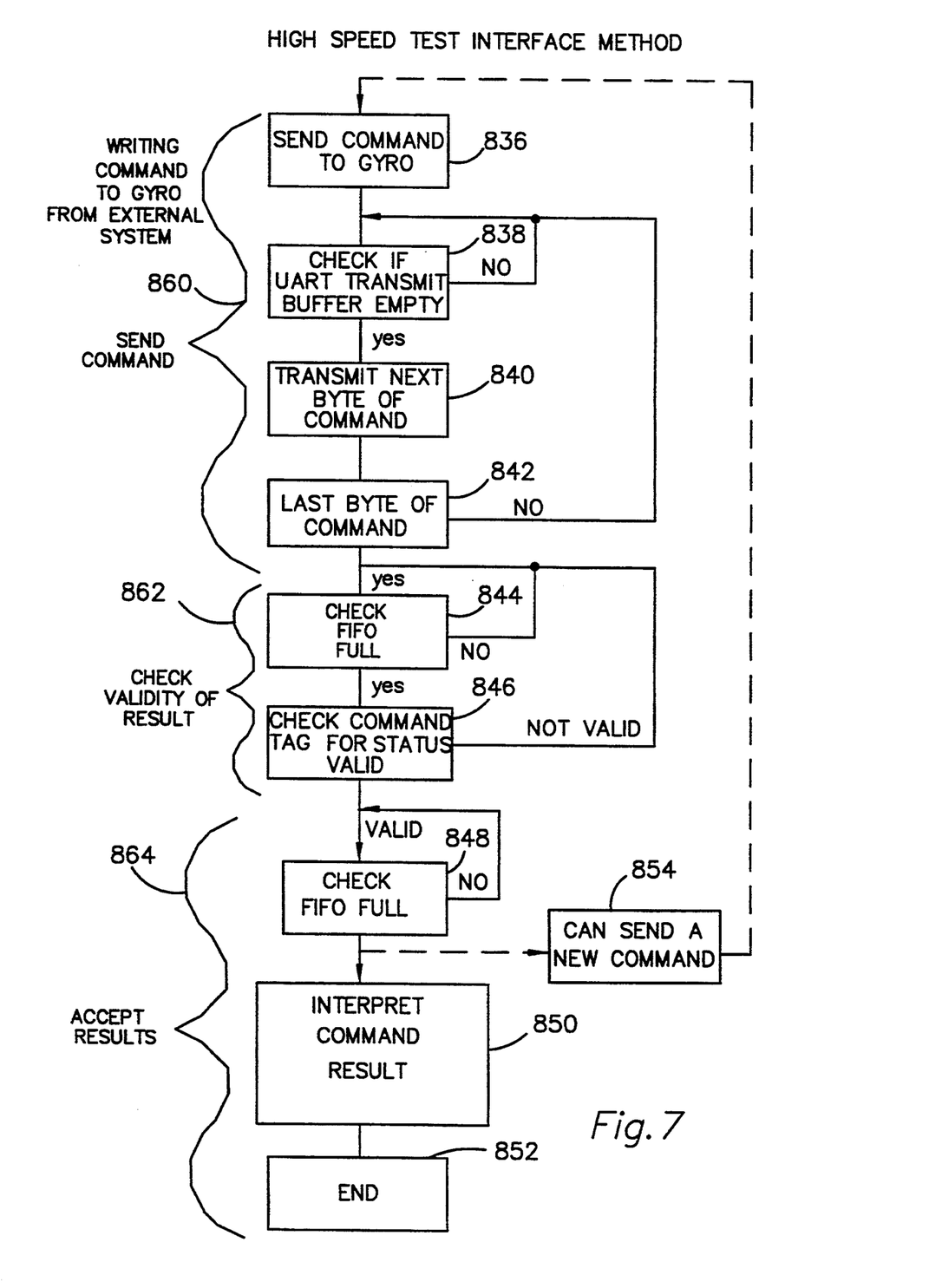
FIG. 7 shows the method of communicating high speed data in the laser gyro high speed test interface.

Now referring to FIG. 7 which shows the method of the invention used to interface the system controller 224 to the laser gyro 10 for high speed testing. The high speed test interface method of FIG. 7 starts by sending a command to the laser gyro in step 836. The process of FIG. 7 occurs in three phases. The first phase is the send gyro command phase 860. The second phase is to check the validity of the result phase 862. The third phase is the accept results phase 864. The process flows from step 836 to step 838 where a check is made to see whether or not the UART serial converter transmit buffer 208 is empty. If the UART serial converter transmit buffer 208 is not empty the process repeats until the serial converter transmit buffer 208 is empty and flows to step 840. In step 840 the process sends the next byte of the command. The process then flows to step 842 to check if this is the last byte of the command. If it is not the last byte of the command the process flows back to step 838 to send another byte. If it is the last byte of the command the process flows to step 844 to wait for the modular gyro to respond. This involves checking whether or not the FIFO 216 set up in FIG. 2 is full. If the FIFO 216 is not full the process returns to step 844 to wait for the modular gyro to fully respond. If the FIFO 216 is full the process checks the command tag for a valid status. If the status is not valid the process flows to 844 to wait for the modular gyro to respond again. If the command tag 244 status is valid the process flows to step 848 to check for the FIFO full. If the FIFO 216 is not full the process returns to 848 to wait for it to fill. The process then flows to 850 where the command is interpreted. At this point the laser gyro has the ability to again accept a new command as shown in 854. The process in that case returns back to 836 where the external processor 224 will send another command to the gyro. After the command is interpreted the process ends at 852.

Figure 8:
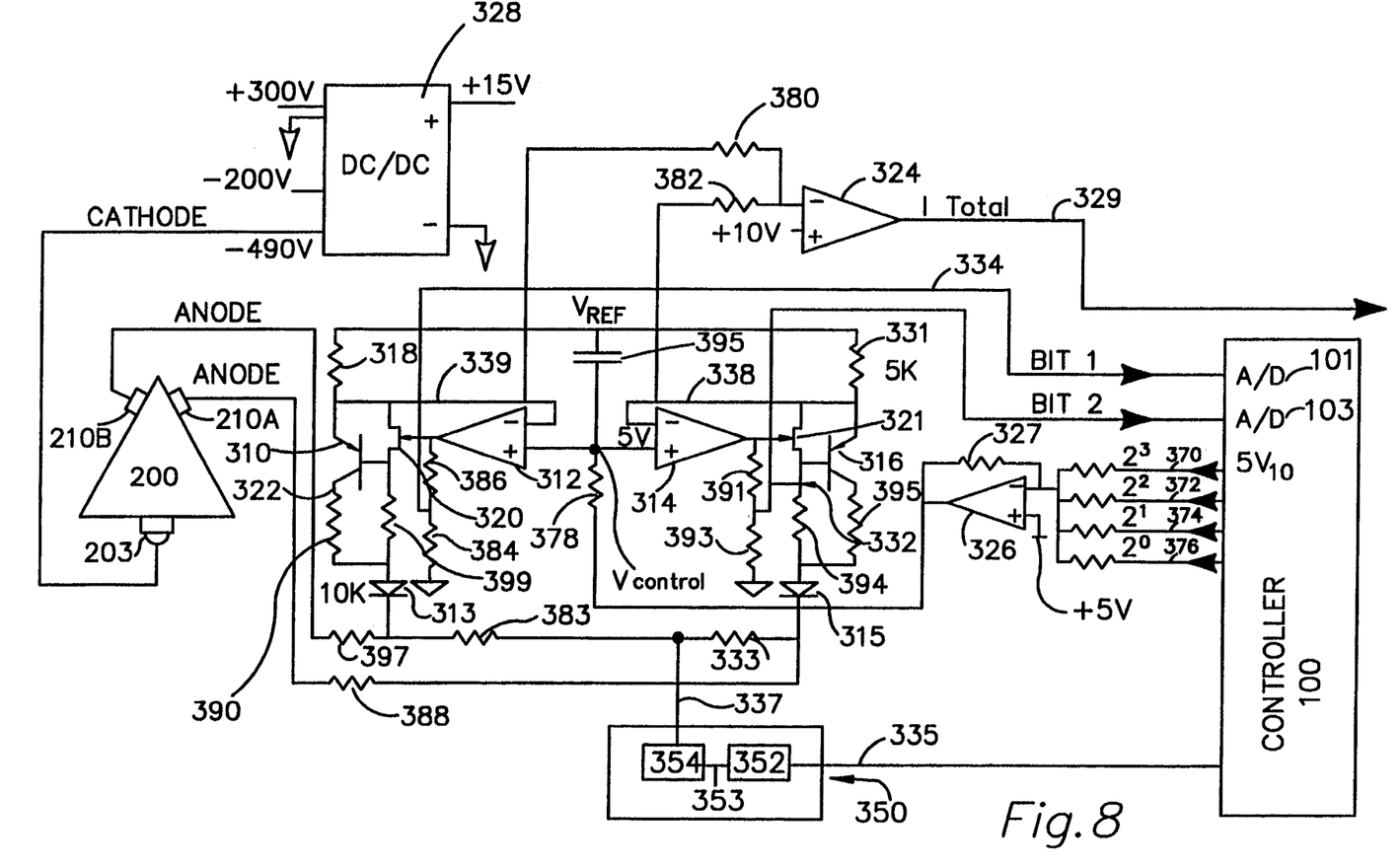
FIG. 8 shows the high voltage start circuit for the laser gyro including the BIT 1 and BIT 2 vector.

Referring now to FIG. 8, which shows a high voltage start circuit 350 which is coupled through resistors 397 and 388 to anode 201A of ring laser gyro block 200.

This circuit is employed during the start mode of the ring laser gyro. At output 335, in this example, controller 100 supplies a 0 to 5 volts square wave at a frequency of about 60 KHz on line 335 which is input to the high voltage start circuit 350. The high voltage starts circuitry 350 comprises a 280 volt pulse generator (not shown) and a voltage multiplier circuit (not shown). The pulse generator is used to step up the input voltage square wave to a 280 volt signal. The 280 volt peak-to-peak signal output is also a 60 KHz signal which is fed into the voltage multiplier means. Voltage multiplier means then outputs a high direct current voltage of about 2500 volts to the anode 201A. The 280 volt pulse generator and the voltage multiplier component are commercially available. The voltage multiplier component may be purchased from Voltage Multiplier, Inc. of California. The high voltage start circuit is used for starting the ring laser gyro and is turned off when the ring laser gyro is in a running mode.

Also included in this example of an active current control as provided by the invention are built in test lines BIT 1 and BIT 2. BIT 1 and BIT 2 are coupled to first and second analog-to-digital inputs 101, 103 respectively of controller 100. BIT 1 and BIT 2 provide test signals which are employed by controller 100 to determine whether or not the active current control is supplying current within predetermined limits under test conditions when the ring laser gyro is in a test run mode.

One example of a built-in-test that may be employed with the instant invention is a high limit test coupled with a low limit test. The high limit test uses the controller 100 to supply a digital command signal to the fourth amplifying means 326 corresponding to a predetermined upper limit for total current. The BIT 1 and BIT 2 signals are then read by the controller 100 and compared by well known comparison means to a nominally acceptable maximum value. Similarly, the low limit test may test the active current control apparatus for a nominally acceptable minimum value. In this way the circuit apparatus can be tested to assure that the apparatus and the ring laser gyro are operating within acceptable limits and are not, for example, operating in a range too near the saturation point of the first and second amplifying means.

Figure 9:
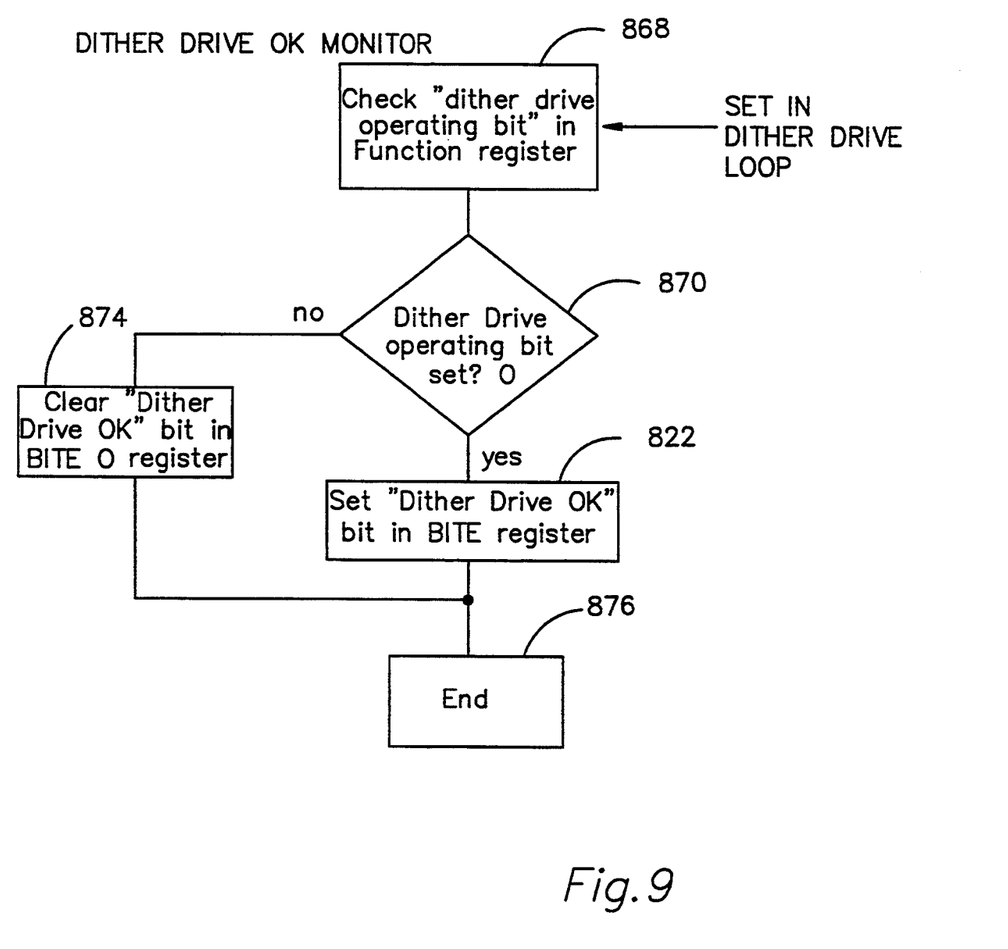
FIG. 9 shows the dither drive monitor.

Now referring to FIG. 9 which shows the method of the invention used to monitor the direct dither drive 500. The direct dither drive sets a dither drive health bit. If the dither drive is healthy the bit is set high, if it is not healthy it is set low. Step 868 checks whether the dither drive operating bit is set in the function register. In step 870, if the dither drive operating bit is set, bit 0 is set to indicate that the dither drive is operating. If the dither drive operating bit is not set then the process flows to 874 to clear bit 0 of the BITE register 334. This indicates that the dither drive is not healthy. When the external system reads the BITE status register 334 bit 0 will indicate a nonfunctional dither drive. In either case the process ends at 876.

Figure 10:
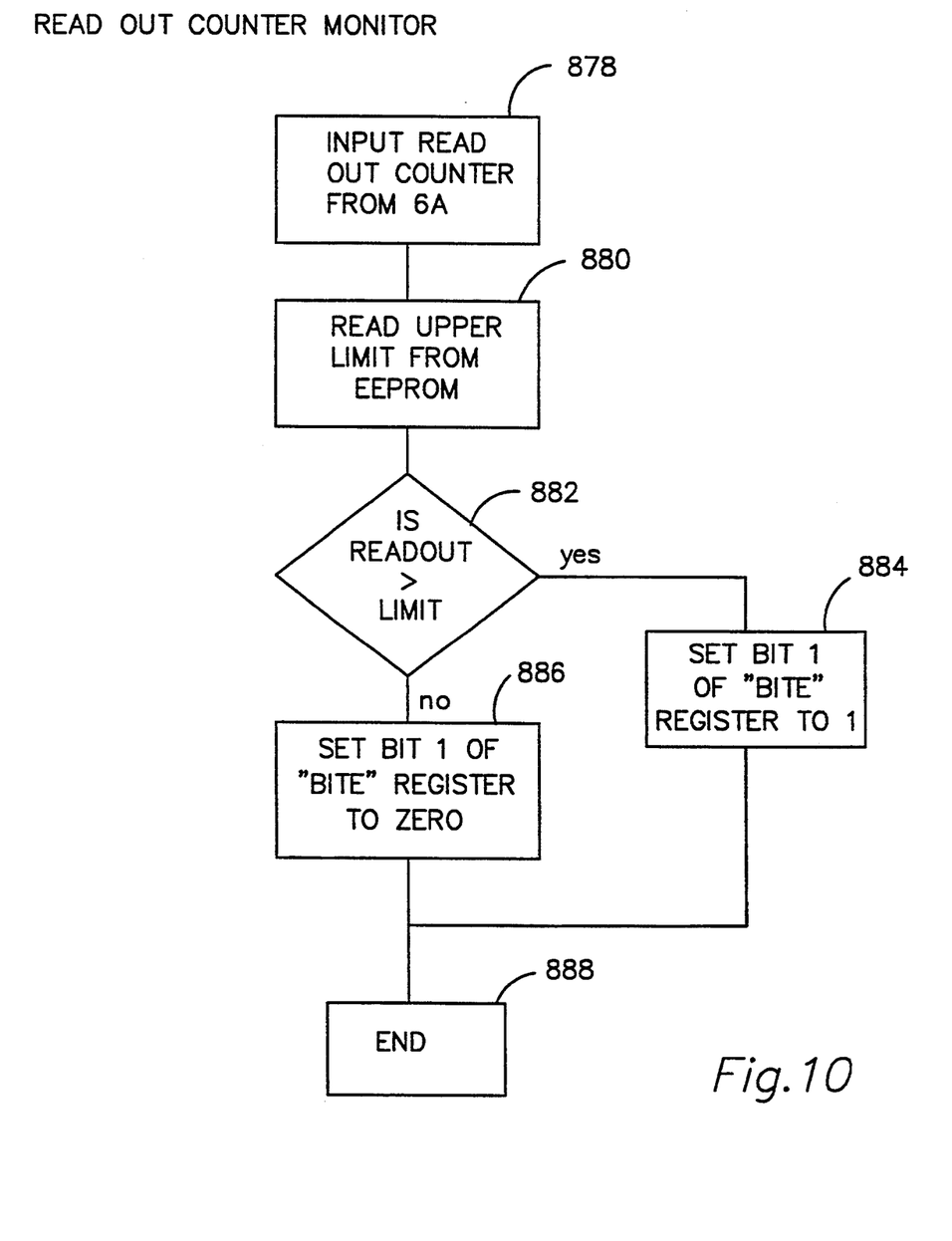
FIG. 10 shows the read out counter monitor.

Now referring to FIG. 10 which shows schematically the method of the invention to monitor the read out counter. The read out counter has an upper limit which is predetermined and is stored in the EEPROM 102. The read out counter monitoring method starts by inputting a read out counter value in step 878 from the gyro 10. The process then accesses the read out counter upper limit from the EEPROM 102. In step 882 the process determines whether the read out counter is greater than the predetermined limit. If it is greater than the limit the process flows to step 884 to set bit 1 of the BITE register to 1. This indicates that the read out counter is not healthy. If the read out counter is less than the limit the process flows to process step 886 to set bit 1 of the BITE register to 0. This indicates that the read out counter is healthy. In either case the process ends at 888.

Figure 11:
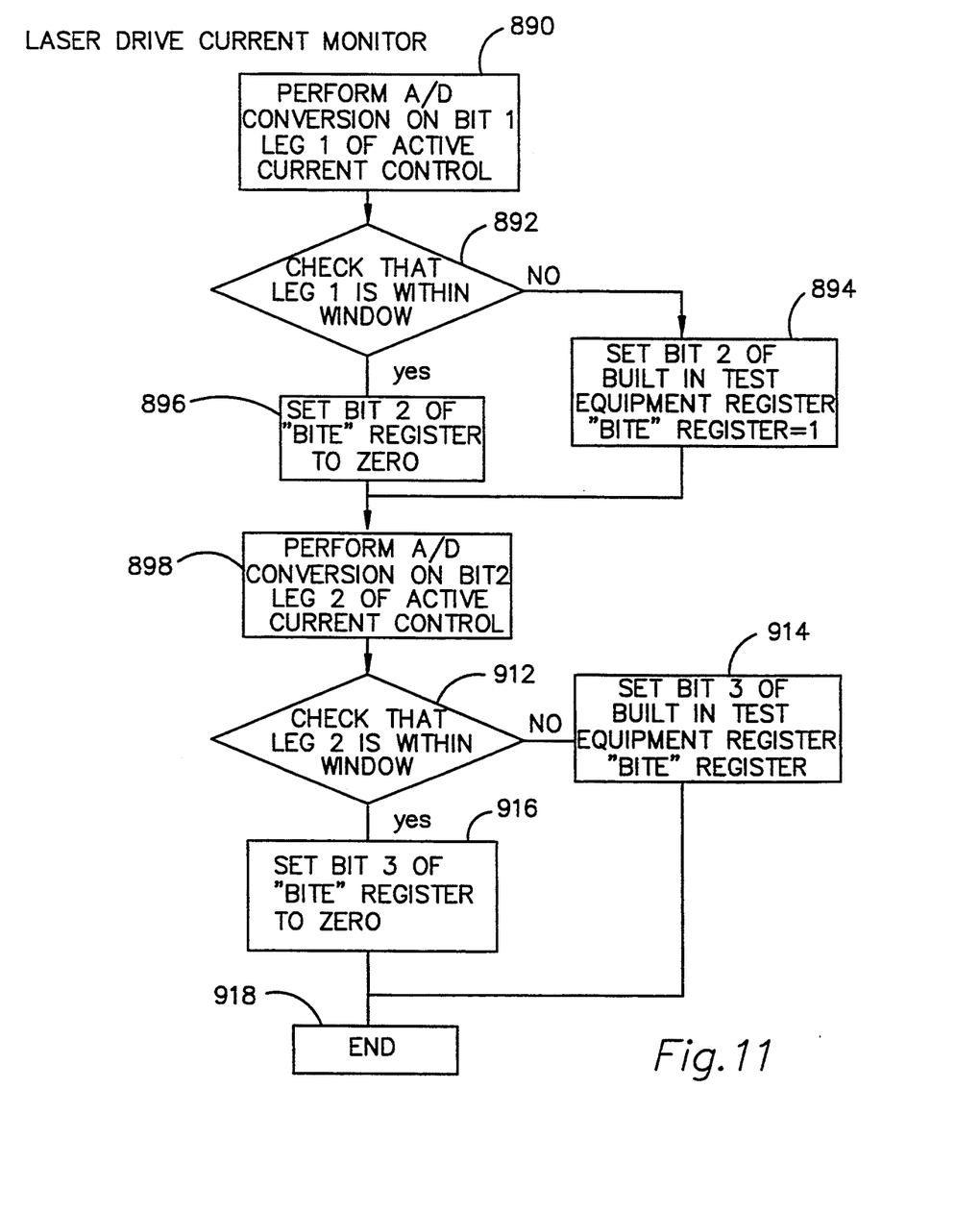
FIG. 11 shows the laser drive current monitor.

Now referring to FIG. 11 which shows the method of the laser gyro 10 to test the laser drive current. The laser drive current is shown with reference to FIG. 8 BITE 1 and BITE 2 which are A/D converted in controller 100. The laser drive current monitor process starts in step 890 where an A/D conversion is done on bit 1 leg 1 of the active current control as shown in FIG. 8. The process flows to step 892 to check whether or not leg 1 is within a window predetermined at the start up of the gyro. The current limits are stored in the EEPROM 102. If the leg 1 current is not within the window then the process flows to 894 to set bit 2 of the BITE register 334 to indicate that the leg 1 current is not within limits. The process flows to step 896 if the leg is within the predetermined window. Bit 2 of the BITE register is set to 0 if the leg 1 current is within the window. The process flows to step 898 where an A/D conversion is performed on the two leg 2 of the active current control loop. The process then flows to 912 to check whether leg 2 is within the leg 2 window. If it is not the process flows to 914 to set Bit 3 of the BITE register 334 to indicate that the leg 2 is not within the window. The process then flows to 916 to set Bit 3 of the BITE register 334 to 0 if the leg 2 current is within the window. In either case the process ends at 918.

Figure 12:
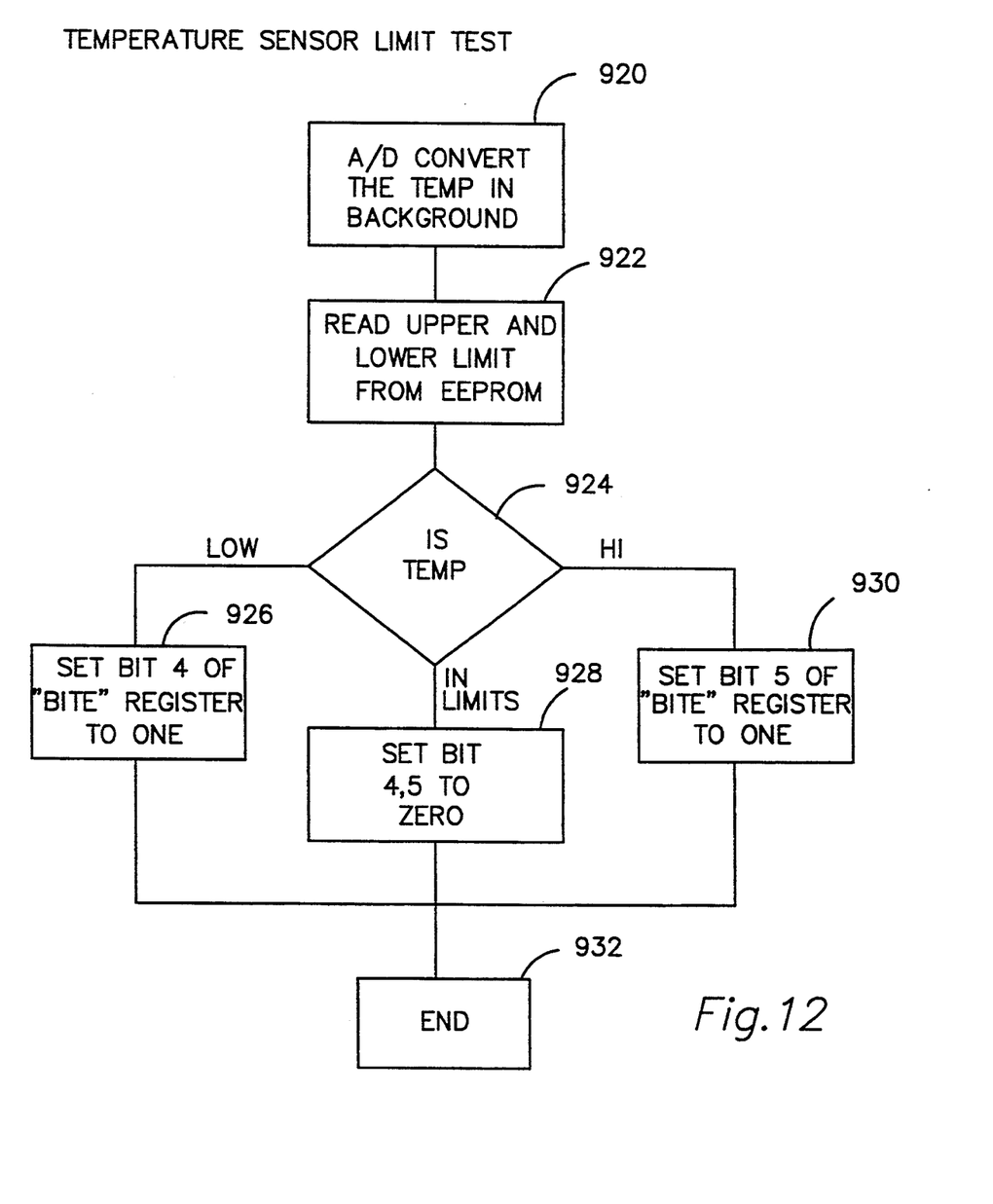
FIG. 12 shows the temperature sensor limit test.

Now referring to FIG. 12 which shows the method of the invention used to sense temperature. The temperature sensor limit test starts by doing an A/D conversion during a background interrupt. The process flows to 922 to read the upper and lower limits from the EEPROM 102. In process step 924 the temperature is checked for being high, low or within limits. If the temperature is low then the process flows to 926 to set bit 4 of the BITE register 334 to 1. This indicates that the gyro is out of temperature on the low side. If the temperature is too high, the process flows from step 924 to step 930 to set bit 5 of the BITE register 334 to indicate that the gyro is over temperature. If the temperature is within the limits the process flows to step 928 to set bit 4 and 5 to 0 in the BITE register 334. In all cases the process flows to 932 to end.

Figure 13:
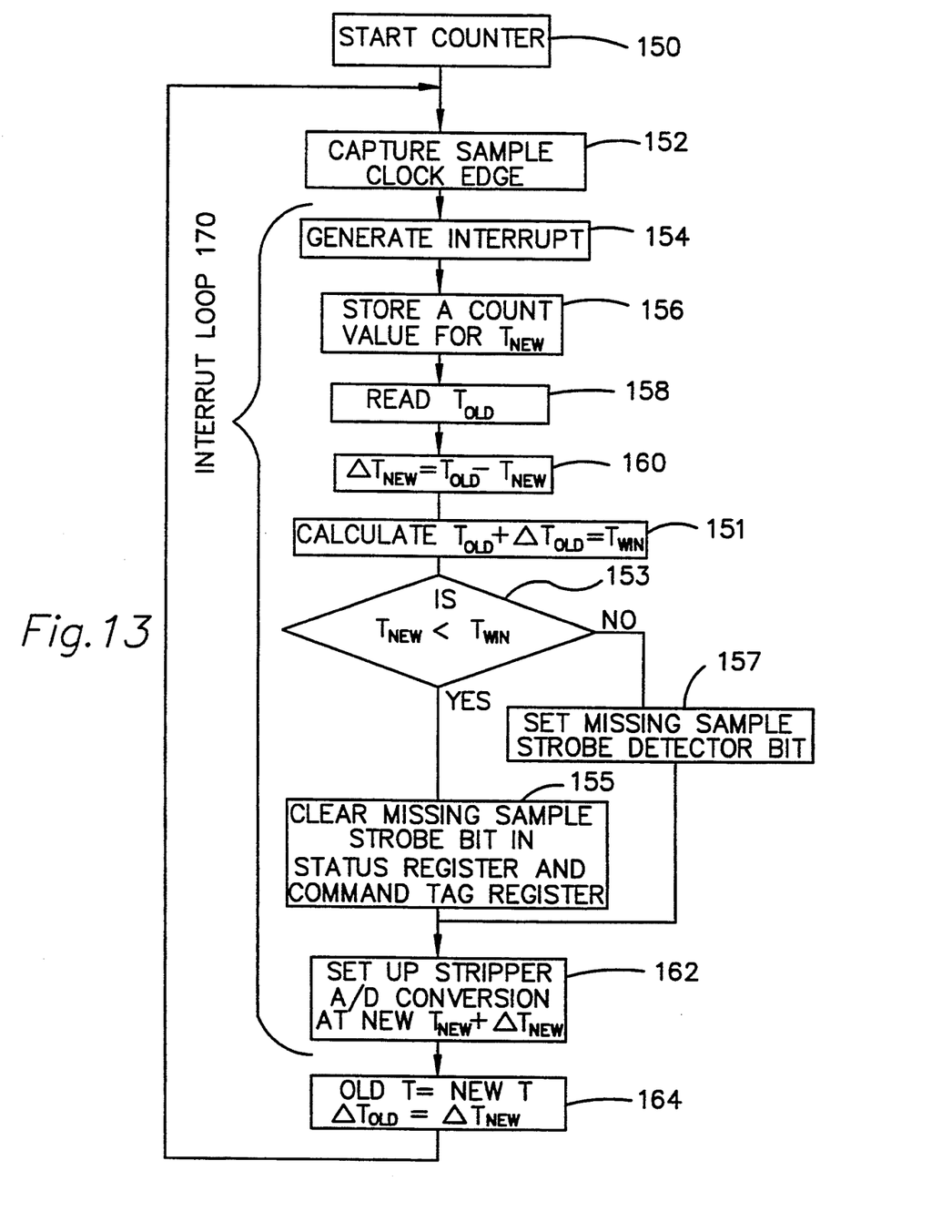
FIG. 13 shows the method of detecting a missing sample strobe.

Now referring to FIG. 13 which shows the method of the invention used to detect whether a sample strobe is missing by the computing and anticipating the occurrence of the next system sample clock. The importance of the sample clock is illustrated by the need for the external system to obtain inertial navigation data which is synchronized to a external clock uniform throughout the inertial navigation system. Without this capability inertial navigation data would be provided asynchronously thus resulting in inaccurate evaluation of inertial position.

The process of FIG. 13 starts a counter in process block 150 when the process is first initialized. The process then flows to process block 152 where an edge of a sample clock from the system is captured which generates an interrupt in process block 154. The interrupt then starts a process called the interrupt loop 170. The interrupt loop schedules an A/D conversion. A count value from the counter of step 150 is stored as $T_{NEW}$ at the interrupt time when the interrupt is generated in process step 156. The process then flows to 158 where the last time an interrupt occurred is read from memory as $T_{OLD}$. The process then flows to 160 where the difference in time between the old interrupt and the new interrupt is computed as delta $T_{NEW}$. The process then flows to calculate the expected window $T_{WIN}$ for the sample strobe which is $T_{OLD}$ plus delta $T_{OLD}$ in step 151. The process flows to decision block 153 to check whether or not the new time is within the expected window. If the new time is within the predicted sample frequency then the missing sample strobe bit in the BITE register 334 is cleared. If the new time is outside of the predicted sampling frequency window then the process steps to step 157 to set the missing sample strobe detector bit in the BITE register 334. In either case the process returns to step 162.

The process then flows to step 162 where the A/D conversion is set up in the high speed output of the microprocessor. The new time for the high speed output to occur is at the $T_{NEW}$ plus delta $T_{NEW}$. The process then flows to 164, the $T_{OLD}$ is set up to be equal to the $T_{NEW}$ and the process returns to process 152 where the next sample clock is captured. The method of FIG. 13 dynamically compensates for changes in system sample clock period and dynamically tracks the behavior of the system sample clock. The A/D conversion step 162 is also used by the direct digital dither drive.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A laser gyro self test apparatus comprising:
   (a) a laser gyro controller comprising a microprocessor with a high speed universal asynchronous receiver transmitter (UART) and a peripheral transaction system controlling the UART the laser gyro controller for monitoring the laser gyro;
   (b) a transmit line connected to the UART;
   (c) a receive line connected to the UART;
   (d) a microprocessor controller external system;
   (e) a serial to parallel converter connected to the transmit line to convert serial data on the transmit line to parallel data having a parallel output;
   (f) a first in first out (FIFO) register means connected to the parallel output having an interface output;
   (g) an interface logic unit connected to the output of the FIFO register means connected to the external system to receive commands from the external system; and
   (h) a parallel to serial converter connected to the interface logic and the receive line to convert parallel data from the interface logic to serial data for communication to the UART.

2. The laser gyro self test apparatus of claim 1 wherein data is sent from the UART to the serial to parallel converter in a UART output frame comprising:
   (a) a status tag BYTE;
   (b) a delta theta BYTE 1;
   (c) a delta theta BYTE 2; and
   (d) a status BYTE 1 and a status BYTE 2.

3. The laser gyro self test apparatus of claim 1 wherein data is sent from the UART to the serial to parallel converter in a UART input frame comprising:
   (a) a command tag in EPROM address 1;
   (b) in EPROM address 2;
   (c) a data BYTE 1; and
   (d) a data BYTE 2.

4. A method of communicating self test data in a laser gyro comprising the steps of:
   (a) loading a command buffer with a command in an external system controlling the laser gyro;
   (b) setting the command buffer full flag to high to indicate that the command buffer is full;
   (c) checking whether the command buffer is full if it is not and if it is executing the following steps;
   (d) decoding the command; and
   (e) executing the command.

5. The apparatus of claim 1 where the microprocessor has a built in test equipment status register comprising a plurality of bits including a first bit which indicates if the dither drive is operating within a predetermined dither drive range, a second bit which indicates if the readout counter is operating within a predetermined counter range, a third bit which indicates if the laser drive current is operating within a predetermined current range, a fourth bit which indicates if the laser drive current of leg 2 is operating within a predetermined current range, a fifth bit which indicates if a high limit temperature sensor is operating within a predetermined high temperature range, and a sixth bit which indicated if a low limit temperature sensor is operating within predetermined low temperature range, and one of which indicates a missing sample strobe.

6. A high speed test interface method for a laser gyro system which includes a universal asynchronous receiver transmitter (UART) the method having a transmit buffer an further including a first-in-first-out (FIFO) register comprising the steps of:
   (a) sending a first BYTE a test command to the gyro;
   (b) checking if the UART transmit buffer is empty and if it is empty executing the next steps, if it is not, waiting for it to fill;
   (c) transmitting the next BYTE of the test command and if it is the last BYTE of the test command then executing the following steps if it is not then returning to step (b);
   (d) wait for the laser gyro to respond by checking whether the FIFO is full, if the FIFO is full process the next step, if it is not wait for it to fill;
   (e) check the command tag for status valid flag, if the command tag is not valid the process returns to wait for the laser gyro to respond in step (d);
   (f) waiting for the FIFO to fill;
   (g) interpreting the command in the FIFO; and
   (h) returning to accept a new command in step (a).

* * * * *